United States Patent
Soo et al.

(10) Patent No.: US 9,525,984 B2
(45) Date of Patent: *Dec. 20, 2016

(54) DEVICES, SYSTEMS AND METHODS FOR MOBILE CUSTOM RESPONSE

(71) Applicant: AT&T Intellectual Property I, L.P., Atlanta, GA (US)

(72) Inventors: Armstrong Soo, San Ramon, CA (US); Bernard S. Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,519

(22) Filed: Nov. 9, 2015

(65) Prior Publication Data
US 2016/0066166 A1 Mar. 3, 2016

Related U.S. Application Data

(63) Continuation of application No. 12/333,071, filed on Dec. 11, 2008, now Pat. No. 9,185,212.

(51) Int. Cl.
| | |
|---|---|
| *H04M 3/42* | (2006.01) |
| *H04W 4/00* | (2009.01) |
| *H04M 1/725* | (2006.01) |
| *H04W 4/12* | (2009.01) |
| *H04M 3/436* | (2006.01) |
| *H04M 3/533* | (2006.01) |
| *H04M 15/00* | (2006.01) |

(52) U.S. Cl.
CPC ............ *H04W 4/12* (2013.01); *H04M 1/7255* (2013.01); *H04M 3/42017* (2013.01); *H04M 3/42059* (2013.01); *H04M 3/436* (2013.01); *H04M 3/53391* (2013.01); *H04M 15/8221* (2013.01); *H04M 3/42153* (2013.01); *H04M 2203/2011* (2013.01)

(58) Field of Classification Search
CPC .................... H04M 3/436; H04M 3/42017
USPC .... 379/207.02, 201.01; 455/412–412.2, 415, 455/458, 426.1
See application file for complete search history.

(56) References Cited

U.S. PATENT DOCUMENTS

| | | |
|---|---|---|
| 5,758,280 A | 5/1998 | Kimura |
| 6,112,084 A | 8/2000 | Sicher et al. |
| 6,252,517 B1 | 6/2001 | Parvulescu et al. |

(Continued)

OTHER PUBLICATIONS

U.S. Office Action dated Oct. 6, 2011 in U.S. Appl. No. 12/333,071.
(Continued)

*Primary Examiner* — William Deane, Jr.
(74) *Attorney, Agent, or Firm* — Hartman & Citrin LLC

(57) ABSTRACT

Devices, systems and methods are disclosed for selecting and sending one of a plurality of responses to a call on a communications device. A user may select a default response or a custom response. When the user receives a call to a communications device, a set of responses is displayed on the communications device to facilitate selection by the user. A response includes a message and a call processing command. A message is in the form of an audio clip, text message, webpage, picture, video, etc. A call processing command is performed along with the message. This plurality of responses can be organized by the user in groups associated with classes of callers, such as friends, family, co-workers, etc. In this manner, the responses available to the user when a call is received changes depending on the caller.

20 Claims, 8 Drawing Sheets

(56) References Cited

U.S. PATENT DOCUMENTS

| | | |
|---|---|---|
| 6,650,746 B1 | 11/2003 | Groen et al. |
| 6,714,781 B2 | 3/2004 | Pecen et al. |
| 6,724,872 B1 | 4/2004 | Moore et al. |
| 6,879,828 B2 | 4/2005 | Virtanen et al. |
| 6,882,709 B1 | 4/2005 | Sherlock et al. |
| 6,971,072 B1 | 11/2005 | Stein |
| 7,062,286 B2 | 6/2006 | Grivas et al. |
| 7,142,841 B1 | 11/2006 | Almassy |
| 7,224,774 B1 | 5/2007 | Brown et al. |
| 7,466,810 B1 | 12/2008 | Quon et al. |
| 7,986,941 B2 | 7/2011 | Luo |
| 8,180,705 B2 | 5/2012 | Kowalchyk et al. |
| 2002/0080751 A1 | 6/2002 | Hartmaier |
| 2003/0185373 A1 | 10/2003 | Boughman et al. |
| 2005/0207556 A1 | 9/2005 | Gonzalez et al. |
| 2005/0252438 A1 | 11/2005 | Belcher |
| 2006/0098792 A1 | 5/2006 | Frank et al. |
| 2007/0053653 A1 | 3/2007 | Huntington |
| 2007/0248221 A1 | 10/2007 | Chatterjee et al. |
| 2009/0122967 A1 | 5/2009 | Loisch et al. |
| 2010/0100387 A1 | 4/2010 | Kuiken et al. |
| 2014/0136609 A1 | 5/2014 | Churchill et al. |

OTHER PUBLICATIONS

U.S. Office Action dated Feb. 15, 2012 in U.S. Appl. No. 12/333,071.
U.S. Office Action dated Aug. 28, 2014 in U.S. Appl. No. 12/333,071.
U.S. Office Action dated Mar. 19, 2015 in U.S. Appl. No. 12/333,071.
U.S. Notice of Allowance dated Jul. 6, 2015 in U.S. Appl. No. 12/333,071.

DEVICES, SYSTEMS AND METHODS FOR MOBILE CUSTOM RESPONSE

CROSS-REFERENCE TO RELATED APPLICATIONS

This application is a continuation of U.S. patent application Ser. No. 12/333,071, now U.S. Pat. No. 9,185,212, entitled "Devices, Systems and Methods for Mobile Custom Response," filed Dec. 11, 2008, which is incorporated herein by reference in its entirety.

BACKGROUND OF THE INVENTION

Field of the Invention

The present invention relates to telecommunications. In particular, the present invention relates to devices and methods for allowing users of a mobile service network increased flexibility in how they respond to calls.

Background of the Invention

Traditionally, in both a plain old telephone service (POTS) or in a mobile service network, when a caller initiates a call to a recipient, a standard ring tone is generated at the recipient's device and a standard ring-back tone is generated at the caller's device. The recipient of the call has little choice in how to respond to this call other than accepting the invitation or letting their device continue to ring.

Developments in mobile service technology have allowed call recipients some choice in how they respond to invitations for a connection via a pre-set list of Caller IDs to be rejected. Rejecting the call immediately terminates the ringing cycle period. A user of a mobile service network may customize the ring-back tone a caller to their device hears. The user could select a piece of music to be played for the caller instead of the standard ring-back tone based on, for example, the caller's Caller ID and the time of the call. Further enhancements of this service, such as allowing for multimedia messages to be played for the caller during the ringing cycle period, have been promoted as well.

Customizable ring-back tones give the user the ability to provide a user-defined response to a call. However, this response must be defined in advance of the call, not in real-time as the call is received by the user's device. Rejecting the call allows the user to decide in real-time how he/she wants to treat the call. However, this rejection is only done in ways defined by the device manufacturer and, possibly, the mobile service provider. There is thus a clear need for a system and apparatus which allows the user of a mobile service network to, in real time, provide a user-defined response to a call. Such a system and apparatus would be ideal for communicating information about the current state of the call recipient in response to the call and allow users to better define when, where, and how they would like to communicate over the mobile service network.

SUMMARY OF THE INVENTION

The present invention teaches a system and method for selecting and sending one of a plurality of responses to a call on a communications device. A user may select a default response or a custom response. When the user receives a call to a communications device, a set of responses is displayed on the communications device to facilitate selection by the user. A response comprises a message and a call processing command. A message is in the form of an audio clip, text message, webpage, picture, video, etc. A call processing command, such as "accept call"; "reject call with voicemail"; "reject call without voicemail"; "place caller on hold"; "forward call to 555-555-5555", "I will call you back"; etc. is performed along with the message. This plurality of responses can be organized by the user in groups associated with classes of callers, such as friends, family, co-workers, etc. In this manner, the responses available to the user when a call is received changes depending on the caller.

In an exemplary embodiment of the present invention, the invention is a method for facilitating a response to a call to a communications device. The method includes displaying a plurality of responses on the communications device, sending a message of a desired response to a caller, and performing a call processing instruction of the desired response. The desired response is selected by a user of the communications device from the plurality of responses.

In another exemplary embodiment of the present invention, the invention is a method for providing a response to a call to a communications device. The method includes defining a plurality of responses, receiving the call to the communications device, and selecting one from the plurality of responses. A user selects the response while the call is pending acceptance, and the response is delivered to the caller.

In a further exemplary embodiment of the present invention, the invention is a device which allows a user to send a response to a call, from a caller, to a communications device. The device includes a housing, a processor within the housing, a display in communication with the processor, a memory in communication with the processor, a response logic on the memory, and a plurality of responses onboard the memory. The user selects one from the plurality of responses on the display, and the response is sent to the caller.

In yet another exemplary embodiment of the present invention, the invention is a system which allows a user to send a response to a call, from a caller, to a communications device. The system includes a server, a database in communication with the server, a communications device in communication with the server, a response logic on the server, and a plurality of responses on the server. The user selects one from the plurality of responses on the server, and the response is sent to the caller.

DETAILED DESCRIPTION OF THE INVENTION

The present invention teaches devices, systems and methods for selecting and sending one of a plurality of responses to a call on a communications device. A user may select a default response or a custom response. When the user receives a call to a communications device, a set of responses is displayed on the communications device to facilitate selection by the user. A response comprises a message and a call processing command. A message is in the form of an audio clip, text message, webpage, picture, video, etc. A call processing command, such as "accept call"; "reject call with voicemail"; "reject call without voicemail"; "place caller on hold"; "forward call to 555-555-5555"; "I will call you back"; etc. is performed along with the message. This plurality of responses can be organized by the user in groups associated with classes of callers, such as friends, family, co-workers, etc. In this manner, the responses available to the user when a call is received changes depending on the caller.

As used herein and throughout this disclosure, a "call" refers to an invitation sent to a communications device to connect with another communications device. A "call" can be an invitation to a voice call, a video call, a text message session, etc. The initiator of the "call" is a "caller".

As used herein and throughout this disclosure, a "mobile service network" refers to any automated telecommunications network which furnishes to users an ability to connect to the network either wired or wirelessly. In an exemplary embodiment of the present invention, the mobile service network is a cellular RF network connecting mobile phones using any appropriate communications standard (UMTS, GSM, IS-136, etc.) and associated communications technologies.

As used herein and throughout this disclosure, a "communications device" refers to a device capable of wired or wireless communication with another device. Examples of a communications device include a cellular telephone, a landline telephone, a personal digital assistant (PDA), a computer, etc.

As used herein and throughout this disclosure, a "response" to an invitation for connection has at least one message and at least one call processing command. A message is any data capable of being transmitted over a network, such as an audio clip, text message, picture, webpage, movie, etc. A call processing command is any command supported by the telecommunications network, such as "accept call"; "reject call with voicemail"; "reject call without voicemail"; "place caller on hold"; "forward call to 555-555-5555", "I will call you back"; etc.

The present invention is applicable to mobile telephones using wireless networks as well as landline telephones using wired networks. For simplicity, examples are shown with respect to mobile telephones and wireless networks. However, the concept is applicable to landline telephones as well.

Figure 1:
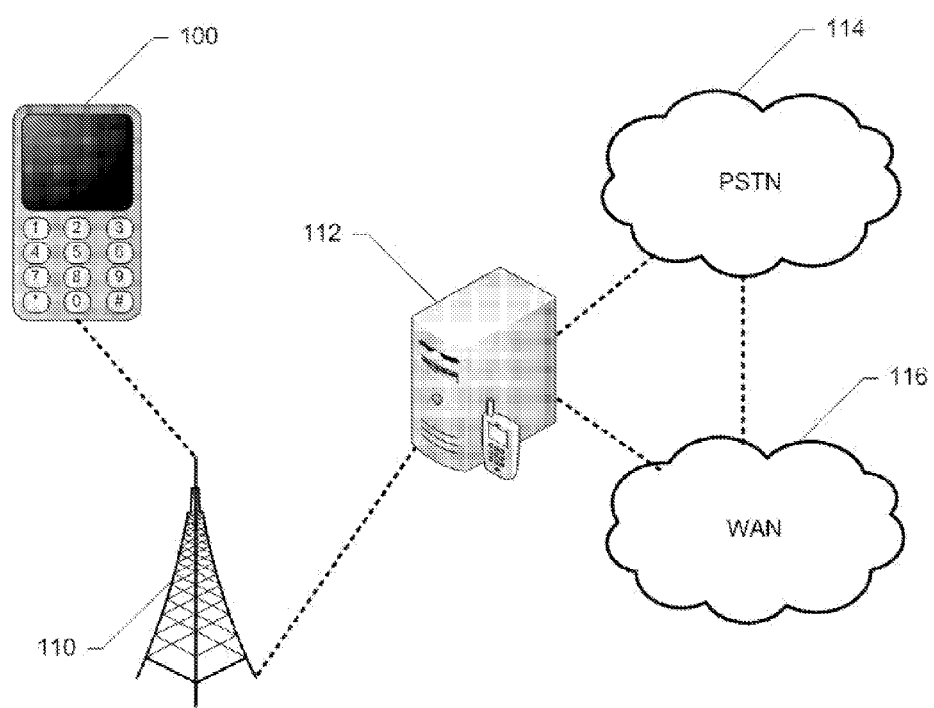
FIG. 1 displays a mobile service network schematic, according to an exemplary embodiment of the present invention.

FIG. 1 shows a mobile service network schematically, according to an exemplary embodiment of the present invention. A user device 100 is in wireless two-way communication with base station 110. Base station 110 exchanges data and network connection control commands or signals with user device 100. Similarly, base station 110 is in communication with, via a wire or wirelessly, a mobile switching center 112 with which it exchanges data and network connection control commands. Recognizing that base station 110 is effective only over a limited range, mobile switching center 112 provides for the two-way connection between user device 100 and any other communications device with which it exchanges information. Mobile switching center 112 is also responsible for managing the connection. Managing the connection includes monitoring the quality of user device 100's connection, registering user device 100 on the network, and setting up communication between user device 100 and some other communications device. Mobile switching center 112 is in communication with a Public Switched Telephone Network (PSTN) 114 and a Wide Area Network (WAN) 116, such as the INTERNET. It is via this communication that mobile switching center 112 provides a connection between user device 100 and a wide range of outside communications devices.

Figure 2:
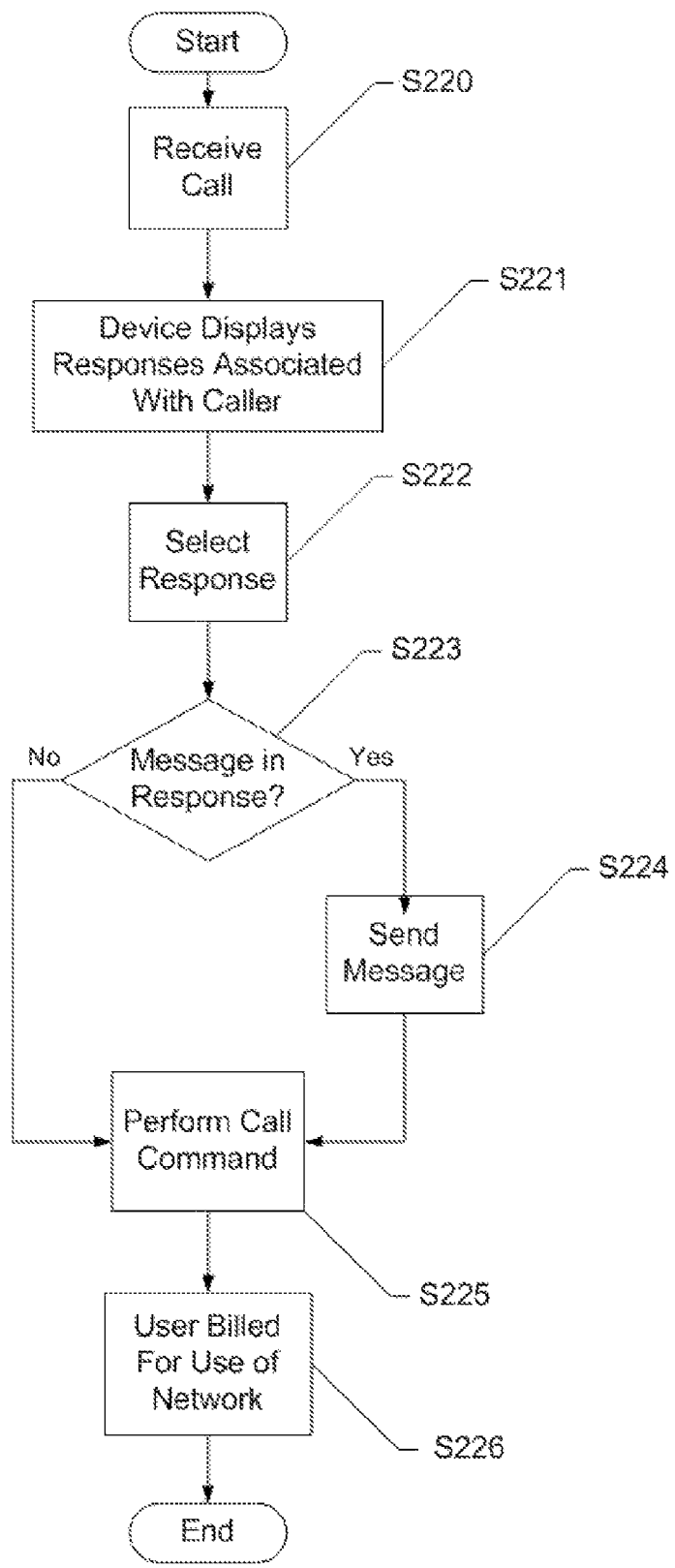
FIG. 2 displays a flow chart showing a method for selecting and sending a response to a call to a communications device, according to an exemplary embodiment of the present invention.

FIG. 2 displays a flow chart showing a method for selecting and sending a response to a call to a communications device, according to an exemplary embodiment of the present invention. The method begins with a user's communications device receiving a call from another communications device S220. Based on an identification of the caller, such as the "Caller ID" of the caller, the user's communications device displays a set of responses and call commands associated with that caller or class of callers S221. The user then selects one of these responses S222. If the response contains a message S223, then the message is sent S224. A message is any data capable of being transmitted over a network, such as an audio clip, text message, picture, webpage, movie, etc. The call command is selected and performed S225. This step can include connecting the caller's communications device to the user's voicemail account or simply rejecting the call. A call command may be tied to a response or can be selected separately. At the conclusion of the process, the user is billed for any network usage fees accrued S226. In this embodiment, network usage fees are based on the amount of network connection time used while a voice message from the user's communication device to the caller's communication device is played. Other ways of producing billing or fees is also possible and within the purview of one skilled in the art after consideration of the present disclosure.

In other exemplary embodiments, the set of responses displayed during the call changes depending on the caller. The user may group responses together and associate that group with a caller or class of callers. For instance, for a class composed of friends there may be four custom responses. In these embodiments, the set of responses may be limited, but easier to find and select. Along with these custom responses the user may also elect to simply answer the call or ignore the call. After a response has been selected but during delivery of the response, the call may still be answered.

Figure 3:
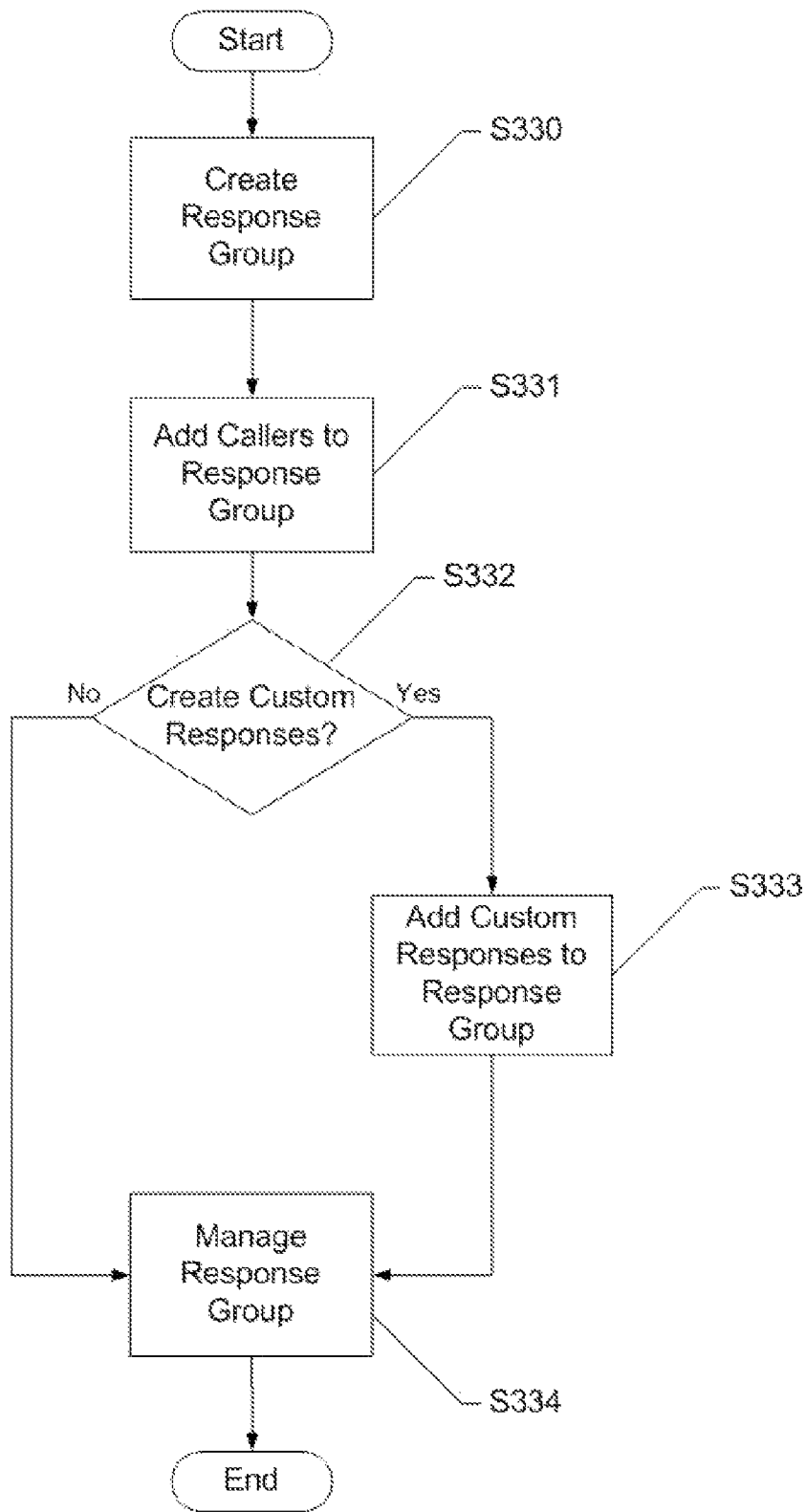
FIG. 3 shows a method of setting up custom responses and organizing them into response groups, according to an exemplary embodiment of the present invention.

FIG. 3 shows a method of setting up custom responses and organizing them into response groups, according to an exemplary embodiment of the present invention. The user creates a response group and gives it a label S330, such as "Friends", "Family", "Clients", "Colleagues", etc. The user then adds a set of callers to each response group S331. The user may select to which response group an unknown caller belongs, such that unknown incoming calls are automatically grouped. The user may also elect to create one or more custom responses S332. The messages included in these responses can be in the form of any data capable of being transmitted over the mobile service network such as an audio clip, text message, webpage, picture, or video. Any call processing commands supported by the mobile service network, such as "accept call", "reject call with voicemail", "reject call without voicemail", "place caller on hold", "forward call to 555-555-5555", "I will call you back", etc., or any combination of data and call processing commands can also be added to each custom response. The message of the custom responses may include data already present on the user's device, such as a song stored in memory of the user's device, or data created specifically to be used with a custom response. For each response group, the user adds the created custom responses S333. Together with the default responses, the created custom responses amount to the set of possible responses the user may select. The user manages the custom responses and response groups by adding, editing, or deleting custom responses; adding, editing, or deleting callers; or creating a new response groups S334.

Such responses could be classified as "custom responses" if they have been defined by the user. For example, a voice message explaining that the user is busy. "Default responses", such as "accept the call" or "reject the call with voicemail", are responses that have been defined by the mobile service network provider or by the device manufacturer. In other exemplary embodiments, a class of callers can be added to a response group. Advanced address books feature complex groups of callers and groups of groups. Exemplary embodiments provide for these address books by allowing any group of callers or group of groups to be associated with a response group.

FIGS. 4A-4D show screenshots of a display of a user device, according to exemplary embodiments of the present invention. These screenshots show the options a user has when receiving a call, creating a caller list, selecting a response, and managing response groups.

Figure 4A:
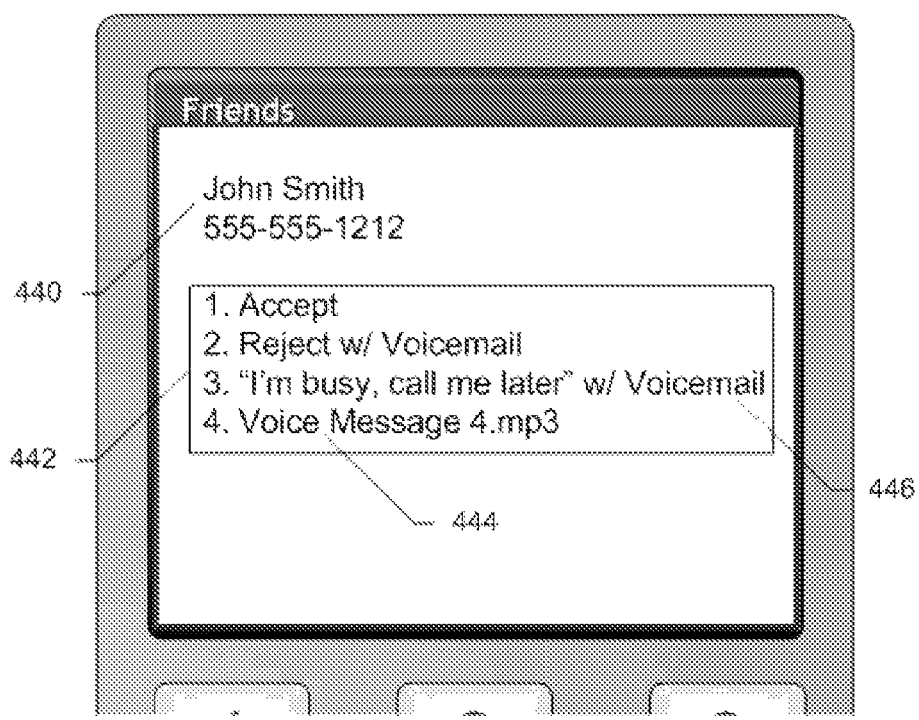
FIG. 4A shows the responses a user may select when receiving a call, according to an exemplary embodiment of the present invention.

FIG. 4A shows the responses a user may select when receiving a call, according to an exemplary embodiment of the present invention. When the user's device receives a call, a caller 440 is displayed, along with a set of responses 442. A response group associated with caller 440 is displayed. Set of responses 442 includes sending data message to the caller's communications device, processing actions such as accepting or rejecting the call, or some combination thereof. Set of responses 442 is composed of default responses and custom responses. The messages of set of responses 442 in this embodiment include an audio clip 444 ("Voicemessage4.mp3") and a text message 446 ("I'm busy, call me later"). The response which includes sending text message 446 also connects the calling device to the voicemail of the user.

Figure 4B:
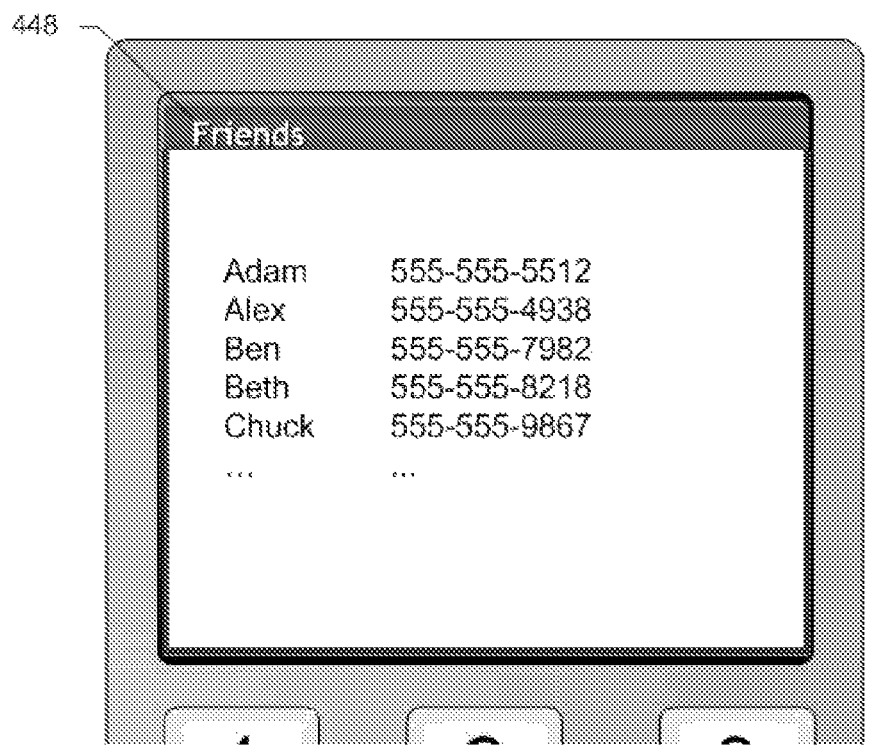
FIG. 4B displays a screenshot of a set of callers belonging to a response group, according to an exemplary embodiment of the present invention.

FIG. 4B displays a screenshot of a set of callers 448 belonging to a response group, according to an exemplary embodiment of the present invention. In this embodiment, a "friends" class of callers 448 is comprised of names and telephone numbers of the callers in the class. In further embodiments of the present invention, the contacts include e-mail addresses, physical addresses, alternate telephone numbers, etc.

Figure 4C:
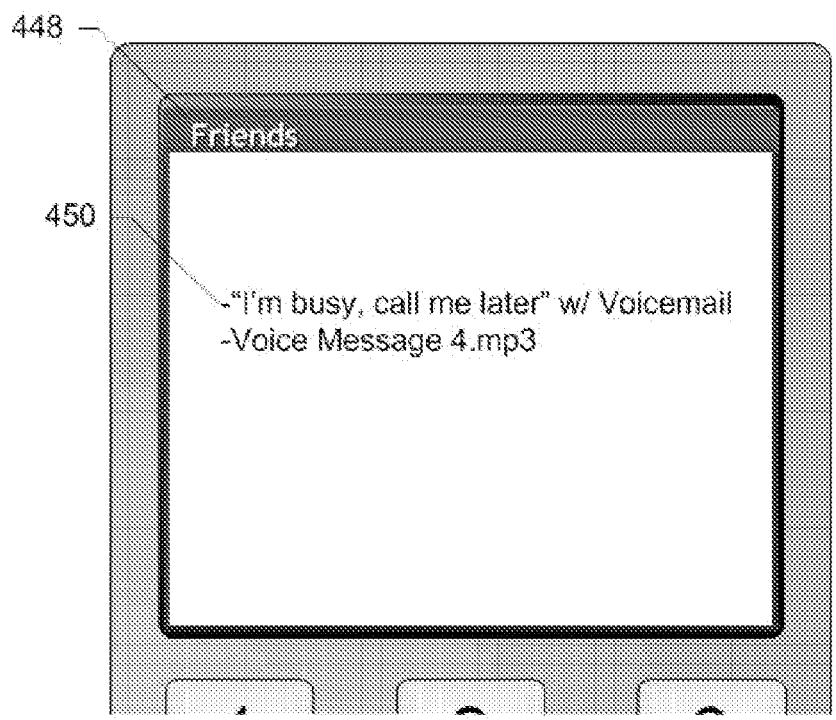
FIG. 4C displays a screenshot of a set of responses ordered under the class of callers, according to an exemplary embodiment of the present invention.

FIG. 4C displays a screenshot of a set of responses 450 ordered under the class of callers 448, according to an exemplary embodiment of the present invention. In this embodiment, response group 450 is for the "friends" class of callers. Response group 450 may also be created for other caller classes, individual callers, any call, etc.

Figure 4D:
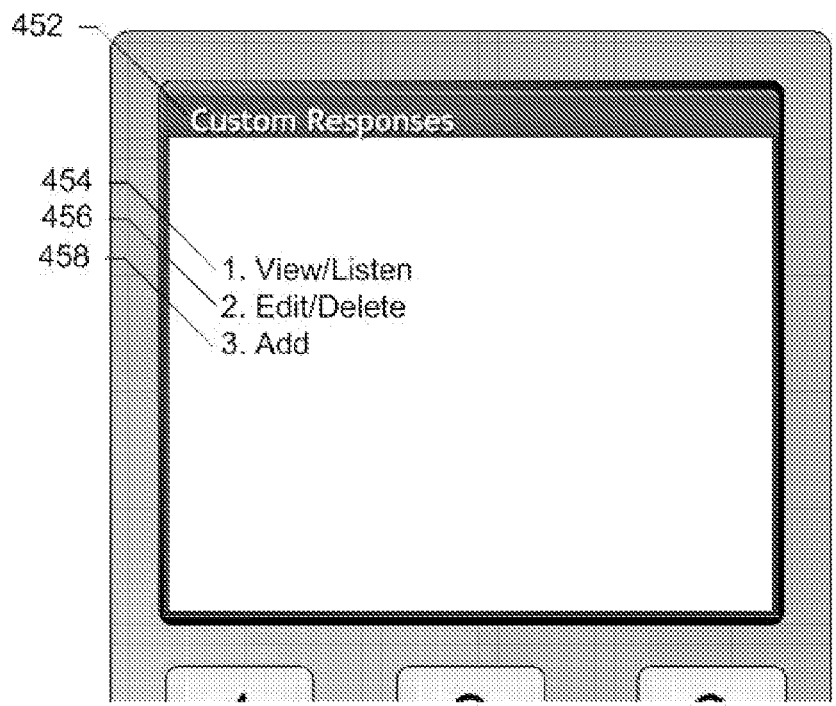
FIG. 4D displays a screenshot of a menu of options for managing the complete set of responses available on a communications device, according to an exemplary embodiment of the present invention.

FIG. 4D displays a screenshot of a menu of options for managing the complete set of custom responses 452 available on a communication device, according to an exemplary embodiment of the present invention. In this embodiment, selecting "View/Listen" 454 displays a list of the complete set of custom responses 452 available on the communication device. Under "View/Listen" option 454, users review and/or replay any of custom responses 452 available on the communications device, confirm any call processing instructions associated with custom responses 452, and confirm the response group to which each custom response is associated. Selecting "Edit/Delete" 456 presents the user with a list of the complete set of custom responses 452 available on the communications device. The user may select any one of custom responses 452 for editing. Editing comprises changing the name of the custom response selected, changing the call processing instructions of the custom response, and/or allowing the user to change the message. If the message is an audio clip, then the user may re-record the audio clip. Selecting "Add" 458 prompts the user to enter a name. Add option 458 then allows the user to create a new custom response message under that name by, for example, recording an audio clip. After the creation of the new custom response message, this feature prompts the user to select call processing instructions associated with the new custom response message, such as "disconnect after sending the message", "put on hold", "send to voicemail", etc. In an alternative embodiment, appropriate if the communications device has a file browser, there is a folder entitled "Custom Responses" to which files on the communications device are sent. Different response groups are represented by subfolders within the "Custom Responses" folder. A user may specify which response group a file is associated with based on the subfolder in which the file is placed. In this embodiment, custom response management features are implemented through the standard management functions of the file browser available for any file stored in the communications device or the management functions of any applications supported by the communications device. It is also possible that user may perform the management function via web browser if supported by the device.

Figure 5:
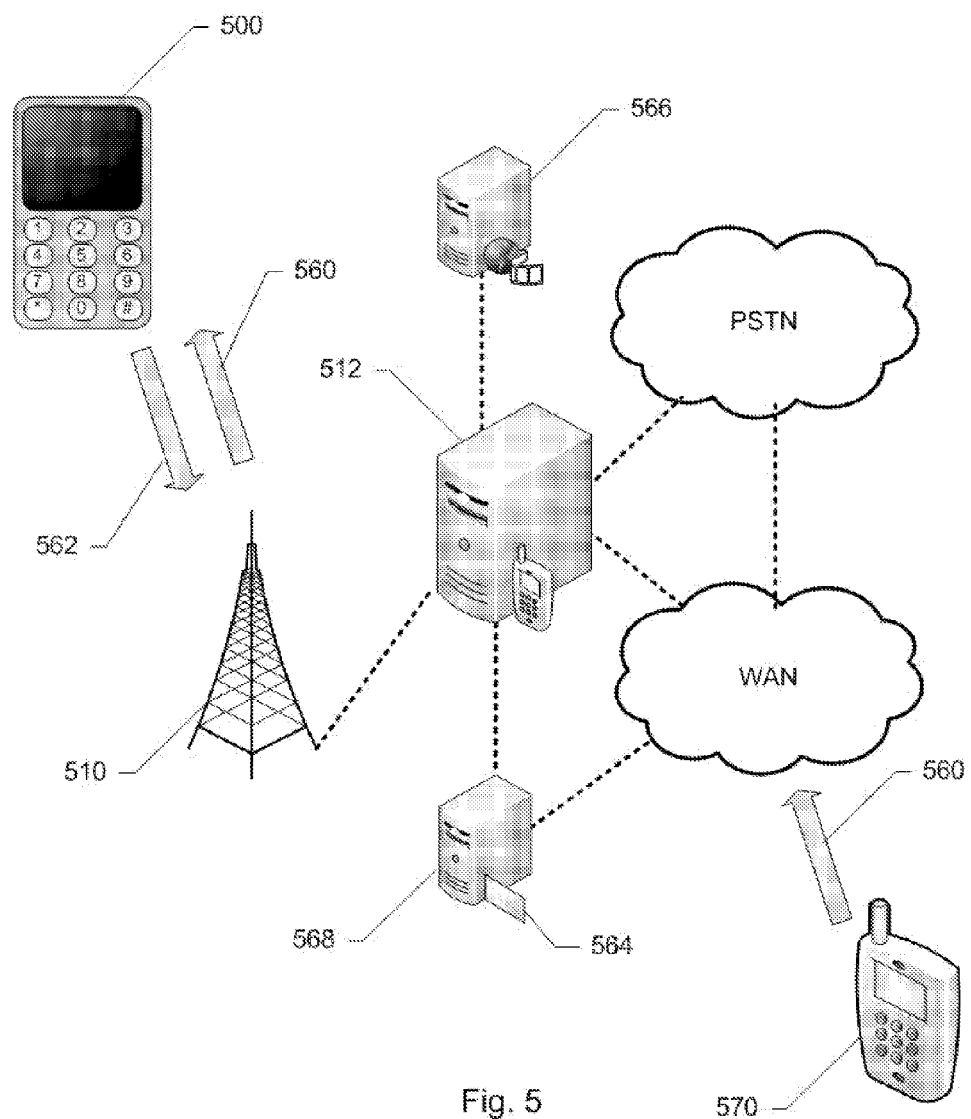
FIG. 5 shows a diagram illustrating schematically the flow of information when a user's communications device delivers a response over a mobile service network, according to an exemplary embodiment of the present invention.

FIG. 5 shows a diagram illustrating schematically the flow of information when a user's communications device 500 delivers a response 562 over a mobile service network, according to an exemplary embodiment of the present invention. In this embodiment, a communications device 570 initiates a call 560 to a user's communication device 500. Call 560 is sent via another mobile service network associated with communications device 570 or any other appropriate telecommunications network which is in communication with the mobile service network. Subsequently, the call 560 reaches the mobile service network and is routed through a mobile switching center 512, a base station 510, and eventually to user's communication device 500. Responding to call 560, user's communications device 500 delivers a response 562 to base station 510. Response 562 includes a message 564, such as an audio clip, delivered to communications device 570, and a set of call processing instructions, such as a request to mobile switching center 512 to connect communications device 570 to a voicemail server 566 of the mobile service network. In some embodiments, response 562 is staggered so that user's communications device 500 waits until it has received confirmation that message 564 sent in response 562 has been delivered to communications device 570 before user's communications device 500 sends a call processing request to communications device 570. Message 564 of response 562 delivered is routed by mobile switching center 512 to a messaging server 568 for delivery to communications device 570. If message 564 is a text message, then messaging server 568 is a Short Message Service (SMS) server. If user's communications device 500 receives a notification that delivery of message 564 has failed, user's communications device 500 sends a request to mobile switching center 512 to connect communications device 570 to the user's voicemail on voicemail server 566.

Figures 6A, 6B:
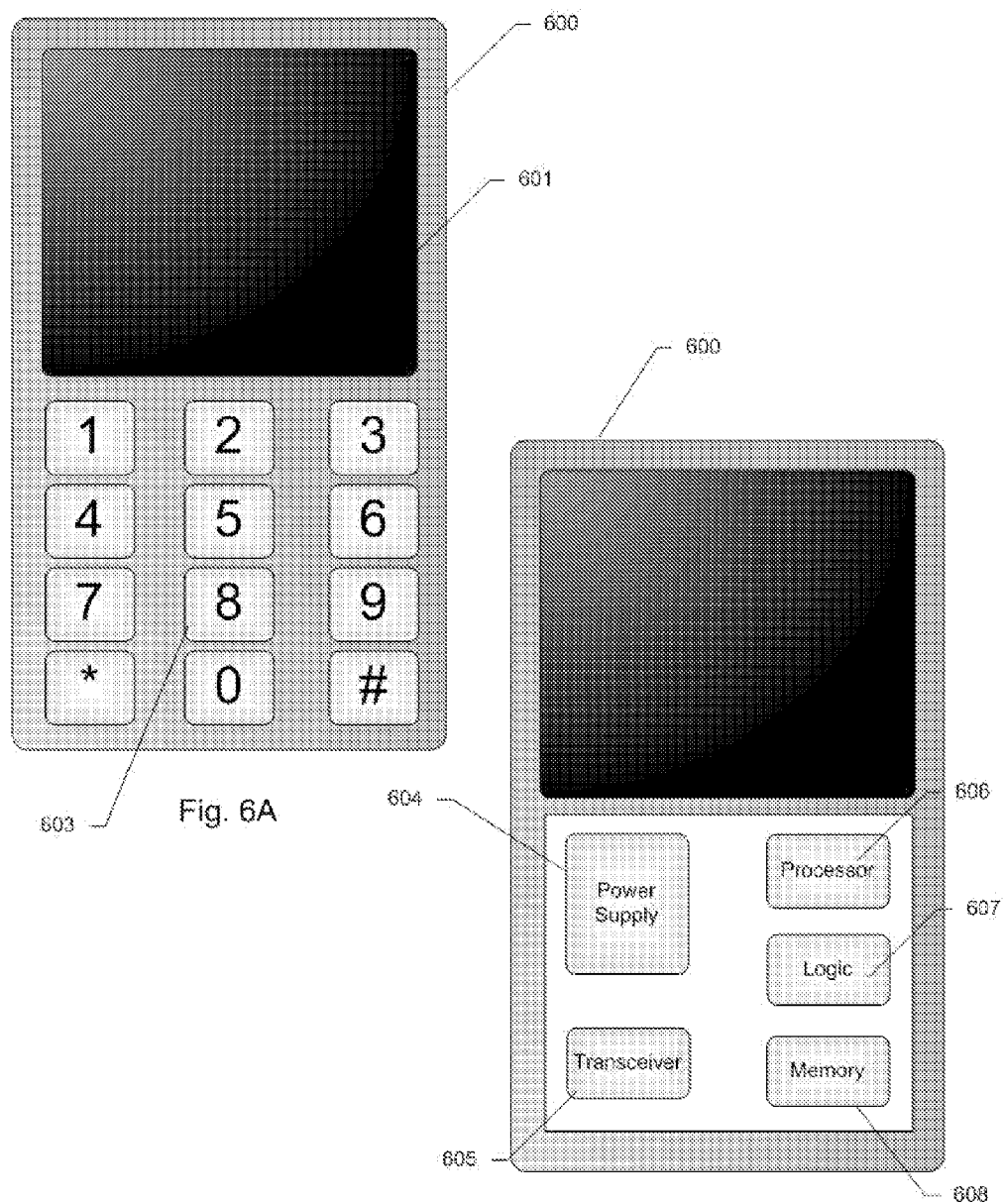
FIGS. 6A and 6B show schematically how information flows inside a communications device, according to an exemplary embodiment of the present invention.

FIGS. 6A and 6B show schematically how information flows inside a communications device, according to an exemplary embodiment of the present invention. The call, which includes caller information such as a Caller ID, is received by communications device 600 via a transceiver 605. The caller information is sent, via a processor 606, to a response logic 607. In this embodiment, response logic 607 is in communication with memory 608, which is loaded with response information. This response information includes the responses of each response group and the callers and classes of callers contained in each response group. The response logic 607 sends the processor 606 the responses associated with the response group which contains the caller. The processor 606 then forwards the responses to the device display 601 so the user can select one of the responses. The responses are arrayed on the device display 601 so that the user may select which of the responses he/she would like. In some embodiments, the responses are numbered and the user selects one of the responses by pressing a corresponding number on a keypad 603. The user's input choice is delivered to processor 606 where it is forwarded to response logic 607. Response logic 607 selects the response associated with the user's input choice and sends a request to process the message and the call processing instructions associated with the selected response. The message and call processing instructions are directed to processor 606 before being transmitted to the base station via a transceiver 605.

In other embodiments, the display is a touch screen which allows the user to directly touch the screen and select one of the responses. The transceiver can be a wired or wireless transceiver such as cellular radio frequency (RF), wireless fidelity (WiFi), BLUETOOTH, etc. The response logic can be stored on either a dedicated memory or use a main memory of the communications device.

Figure 7:
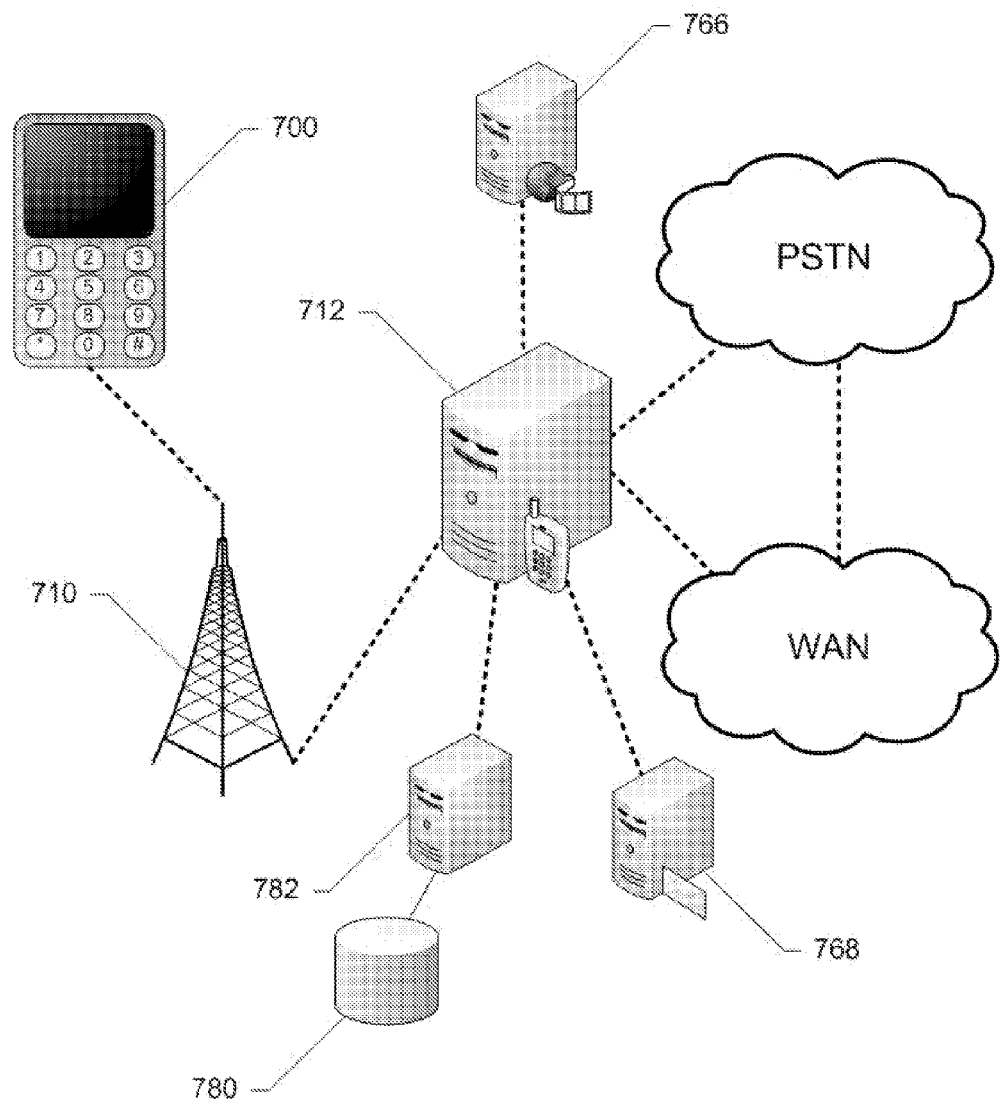
FIG. 7 shows a system which allows a user to send a response to a call, from a caller, to a communications device, according to an exemplary embodiment of the present invention.

FIG. 7 shows a system which allows a user to send a response to a call from a communications device, according to an exemplary embodiment of the present invention. This is an alternative embodiment in which, rather than the responses being stored in the memory of a user's communication device 700, a response database 780, in communication with a response server 782, stores the responses. The responses for each response group, the messages and call processing instructions of each response, and the callers and classes of callers associated with each response group are loaded onto the response database 780. Response database 780 is connected to a mobile switching center 712 via response server 782. When user's communications device 700 is powered on, as part of its registration process on the mobile service network, the memory of user's communications device 700 is loaded with all response group information. In further embodiments, response server 782 contains an onboard logic with which it determines the responses to be delivered to user's communications device 700. Mobile switching center 712 sends the responses through base station 710 along with calls. In these embodiments, the user input choice is relayed to response server 782 which retrieves the response messages and the call processing instructions from response database 780 associated with that user input choice. Response server 782 then routes the message and call processing instructions to the mobile switching center 712 for delivery of the message to a communications device and implementation of the call processing instructions. The voicemail server 766 and messaging center 768 operate as described above with respect to other embodiments.

In some embodiments, the response server waits for confirmation that the message is received by the communications device before sending the call processing instructions to the mobile switching center for implementation. If no confirmation is received, the mobile switching center connects the communications device to the voicemail server.

The present invention has many uses that are readily recognizable by one skilled in the art. One example of such a use is a real estate agent appreciating a choice to play, "I am showing a property with a client right now. I've got your number and I will call you back shortly." Another example is a user needing to step out of a meeting or noisy environment to answer a call. The user can play, "Please hold on while I am stepping out to answer your call. Don't hang up."

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A non-transitory computer-readable storage medium comprising computer-executable instructions that, when executed by a response server, cause the response server to perform operations comprising:

receiving a selected response from a mobile switching center, the selected response originating from a first mobile phone, wherein the first mobile phone is associated with a callee and the first mobile phone is operating on a mobile service network operating in accordance with a communications standard that supports simultaneous voice and data communications, wherein the selected response is selected by the callee from a plurality of responses displayed on the first mobile phone while a call is pending acceptance by the callee, and wherein each of the plurality of responses is associated, in a response database in communication with the response server, with a custom message created by the callee and a call processing instruction identified by the callee;

in response to receiving the selected response, retrieving from the response database, a selected custom message associated with the selected response and a selected call processing instruction associated with the selected response; and routing, by the response server, the selected call processing instruction and the selected custom message to the mobile switching center for delivery to a second mobile phone associated with a caller.

2. The non-transitory computer-readable storage medium of claim 1, wherein the operations further comprise receiving a confirmation that the selected custom message is received at the second mobile phone before routing the selected call processing instruction to the mobile switching center.

3. The non-transitory computer-readable storage medium of claim 1, wherein the operations further comprise assigning the selected response to a group of responses associated with a class of callers.

4. The non-transitory computer-readable storage medium of claim 3, wherein the plurality of responses displayed on the first mobile phone is based on the caller.

5. The non-transitory computer-readable storage medium of claim 3, wherein the class of callers comprises at least one of a friends class, a family class, or a co-workers class.

6. The non-transitory computer-readable storage medium of claim 1, wherein the operations further comprise charging a fee for the selected response.

7. A non-transitory computer-readable storage medium comprising computer-executable instructions that, when executed by a mobile phone associated with a callee, cause the mobile phone to perform operations comprising:

in response to receiving a voice call from a further mobile phone associated with a caller, presenting, on a display, a plurality of custom responses while the voice call is pending acceptance by the callee;

receiving selection of a custom response from the plurality of custom responses, wherein the custom response is associated with a message and a call processing instruction; and transmitting the custom response to a mobile switching center that provides the custom response to a response server that retrieves, from a response database, the message and the call processing instruction and provides the message and the call processing instruction to the mobile switching center to be delivered to the further mobile phone associated with the caller.

8. The non-transitory computer-readable storage medium of claim 7, wherein the plurality of custom responses is associated with the caller.

9. The non-transitory computer-readable storage medium of claim 7, wherein the plurality of custom responses is associated with a group of callers comprising the caller.

10. The non-transitory computer-readable storage medium of claim 7, wherein the plurality of custom responses is associated with a class of callers.

11. The non-transitory computer-readable storage medium of claim 10, wherein the class of callers comprises at least one of a friends class, a family class, or a co-workers class.

12. The non-transitory computer-readable storage medium of claim 7, wherein the message comprises an audio clip, a text message, a picture, or a video.

13. The non-transitory computer-readable storage medium of claim 7, wherein the call processing instruction comprises accept the voice call, reject the voice call with voicemail, reject the voice call without voicemail, place the voice call on hold, or forward the voice call.

14. A non-transitory computer-readable storage medium comprising computer-executable instructions that, when executed by a response server, cause the response server to perform operations comprising:

receiving, from a mobile service network, a custom response to a voice call directed to a mobile phone associated with a callee, wherein the custom response is selected by the callee, via the mobile phone, while the voice call is pending acceptance;

retrieving, from a response database, a message and a call processing instruction associated with the custom response; and providing the message and the call processing instruction to the mobile service network.

15. The non-transitory computer-readable storage medium of claim 14, wherein the mobile service network operates in accordance with a communications standard that supports simultaneous voice and data communications.

16. The non-transitory computer-readable storage medium of claim 14, wherein providing the call processing instruction to the mobile service network comprises routing the call processing instruction to a mobile switching center.

17. The non-transitory computer-readable storage medium of claim 16, wherein the call processing instruction comprises accept the voice call, reject the voice call with voicemail, reject the voice call without voicemail, place the voice call on hold, or forward the voice call.

18. The non-transitory computer-readable storage medium of claim 14, wherein the message comprises an audio clip, a text message, a picture, or a video.

19. The non-transitory computer-readable storage medium of claim 14, wherein the custom response is associated with a caller who placed the voice call.

20. The non-transitory computer-readable storage medium of claim 19, wherein the custom response is associated with a group of callers comprising the caller.

* * * * *